Dec. 17, 1963 R. H. BAUMAN 3,114,439
AUTOMATIC BRAKE ADJUSTER
Filed Jan. 14, 1963 2 Sheets-Sheet 1
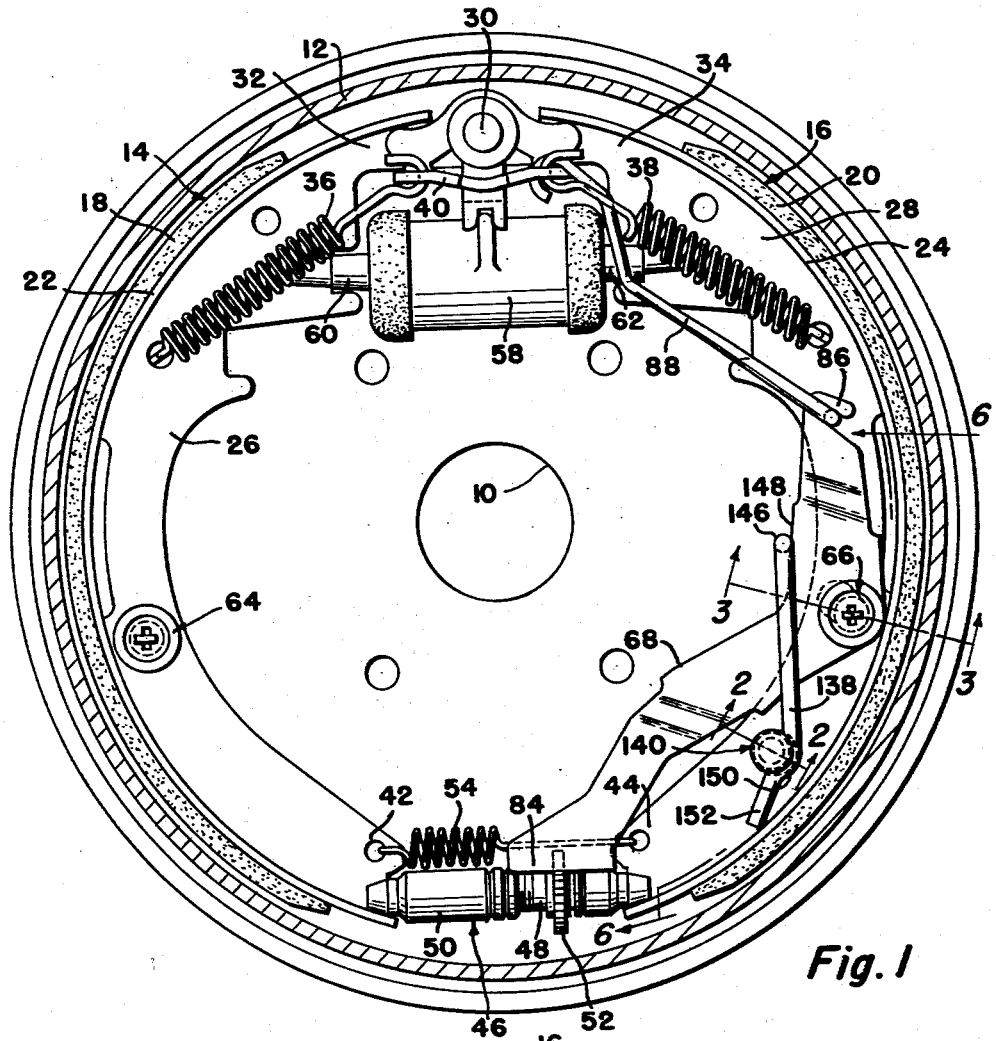
Fig. 1
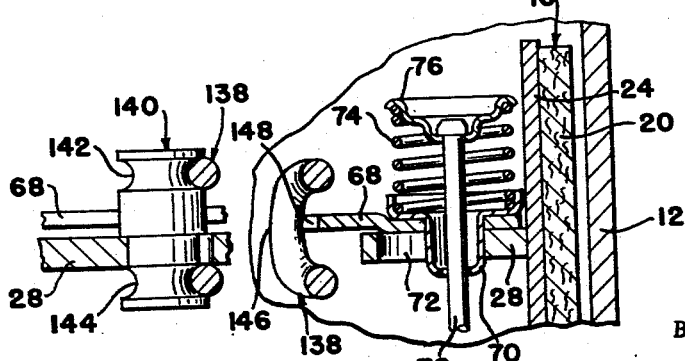
Fig. 2
Fig. 3
INVENTOR.
Robert H. Bauman
BY D.D. McGraw
His Attorney

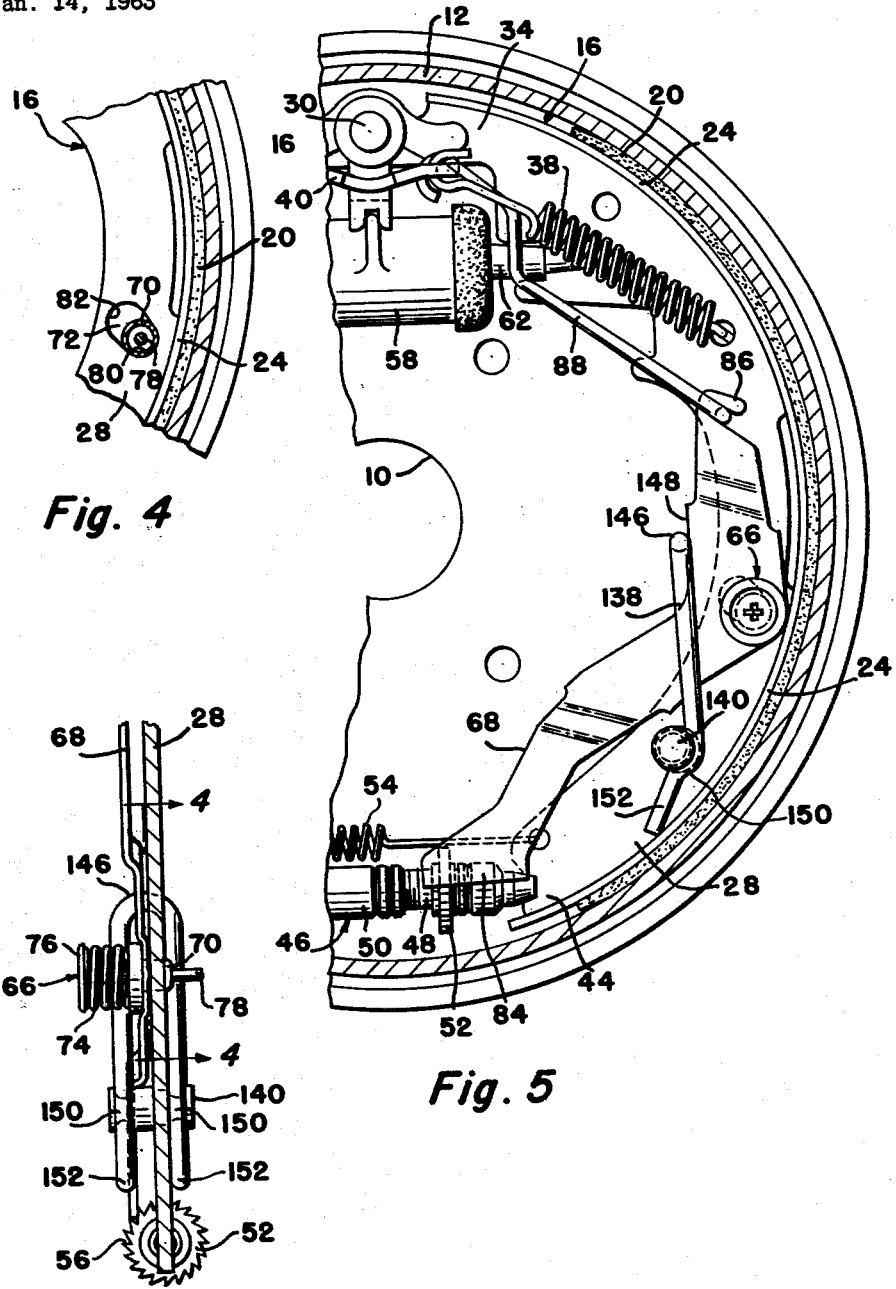

United States Patent Office
3,114,439
Patented Dec. 17, 1963

3,114,439
AUTOMATIC BRAKE ADJUSTER
Robert H. Bauman, Dayton, Ohio, assignor to General Motors Corporation, Detroit, Mich., a corporation of Delaware
Filed Jan. 14, 1963, Ser. No. 251,216
5 Claims. (Cl. 188—79.5)

The invention relates to an automatic adjuster for drum type brakes to maintain the brake shoes in a predetermined clearance condition relative to the brake drum to compensate for wear of the linings on the brake shoes. In a brake utilizing an adjusting strut which adjusts the clearance between the brake shoe and the drum, there are times during brake application that the thrust load on the adjusting strut is so high that the strut cannot be extended by the adjusting device so that any automatic adjusting mechanism that is connected with the adjusting strut is prevented from normal operation. Under this condition excessively high loads are carried in the automatic adjusting mechanism which tend to break or bend parts of the mechanism, thus creating a malfunctioning mechanism during future attempted automatic brake adjustments. Mechanism embodying the invention provides an automatic brake adjusting unit which includes structure for relieving excessively high loads from the automatic adjusting mechanism when they tend to occur.

The mechanism includes a lost motion action between the adjusting lever of the automatic brake adjusting mechanism, which is mounted for pivotal movement and translatory movement in a slot on a shoe web, and the shoe web. This is preferably accomplished by providing a slot formed in the shoe web and spring means urging a lever support bushing to one end of the slot and resisting any translatory movement of the lever. The spring takes its reaction on the shoe web through a spring reaction member and is preferably a U-shaped cantilever type spring. The spring preferably straddles the adjusting lever and the shoe web so that it provides a force directly in the plane of the adjusting lever to minimize binding action of the lever relative to the web. A fixed length connection between the adjusting lever and a fixed point on the brake assembly such as the anchor pin is utilized to cause the lever to rotate or translate relative to the shoe web. Lever rotation is obtained when the adjusting strut permits normal adjustment. However, when normal movement of the adjusting lever is prevented by high thrust loads on the adjusting strut, or by other means such as an adjusting strut extension limiter, the adjusting lever moves in a translatory manner relative to the shoe web and the U-shaped spring accommodates this movement, thus absorbing movement of the brake shoe and relieving the automatic adjusting mechanism of excessively high loads.

The invention is an improvement over the automatic brake adjuster disclosed and claimed in Patent No. 3,050,157, entitled "Automatic Brake Adjuster" and issued to William V. Kenzik and Wilbur J. Oakley on August 21, 1962.

In the drawings:
FIGURE 1 is a cross-section view of a brake mechanism incorporating features of the invention.
FIGURE 2 is a fragmentary cross-section view with parts broken away taken in the direction of arrows 2—2 of FIGURE 1.
FIGURE 3 is a fragmentary cross-section view illustrating the mounting of the adjusting lever on the shoe web and taken in the direction of arrows 3—3 of FIGURE 1.
FIGURE 4 is a fragmentary cross-section view taken in the direction of arrows 4—4 of FIGURE 6 and illustrating the construction of a portion of the shoe web on which the adjusting lever is mounted.
FIGURE 5 is an enlarged view of a part of the brake illustrated in FIGURE 1 and showing the excessive load relief action of the self-adjusting mechanism embodying the invention.
FIGURE 6 is a cross-section view having parts broken away and taken in the direction of arrows 6—6 of FIGURE 1.

The brake in which the invention is incorporated includes a backing plate 10 which is a stationary member and is adapted to be secured to an axle housing or axle spindle of a motor vehicle. The brake drum 12 is adapted to be carried by a wheel of the vehicle. Primary brake shoe 14 and secondary brake shoe 16 are supported on the backing plate 10 and include linings 18 and 20, rim portions 22 and 24 to which the linings are respectively attached, and web portions 26 and 28 which support the rim portions. Web portions 26 and 28 are respectively secured to the rim portions 22 and 24 so that each brake shoe structure is in the form of a T-shaped element having a generally arcuate contour for placement within the brake drum 12. Shoes 14 and 16 are supported on suitable raised support pad portions on the backing plate 10 in the conventional manner and as illustrated form a part of a duo-servo brake mechanism.

Anchor pin 30 is secured to the backing plate 10 and is engaged by cooperating adjacent ends 32 and 34 of the brake shoes 14 and 16, respectively. Retraction springs 36 and 38 are secured at their adjacent ends to a bracket 40 positioned on the anchor pin 30 to hold the ends 32 and 34 of the brake shoes in engagement with the anchor pin 30. Spring 36 is secured at its other end to the shoe web 26 while spring 38 is secured at its other end to the shoe web 28.

The opposite adjacent ends 42 and 44 of the respective brake shoes 14 and 16 engage an adjusting strut 46 that has a threaded member 48 threadedly received by the cylinder member 50 so that rotation of the adjusting wheel 52 will effect extension of the adjusting strut 46. An extension spring 54 is secured at opposite ends to the end portions 42 and 44 of the respective brake shoes to retain the ends of the brake shoes in engagement with opposite ends of the adjusting strut 46. The adjusting wheel 52 has its periphery provided with a series of serrations 56 adapted for engagement by the adjusting mechanism hereinafter described or by means of a tool operated by a mechanic for manual adjustment of the brake shoes relative to the brake drum.

A hydraulic wheel cylinder 58 receiving hydraulic fluid under pressure from a master cylinder in the conventional manner is provided with plunger members 60 and 62 which respectively engage the webs 26 and 28 of the shoes to urge the brake shoes into engagement with the brake drum when pressurized hydraulic fluid is delivered from the master cylinder to the wheel cylinder 58.

The brake shoes 14 and 16 are retained on the guide support pads of the backing plate 10 by means of hold-down spring assemblies 64 and 66. Assembly 64 holds shoe 14 in the conventional manner while assembly 66 is modified as a part of the adjusting mechanism embodying the invention. An adjusting lever 68 is mounted on the web 28 of shoe 16 by means of the hold-down spring assembly 66. As shown in FIGURE 2, the lever 68 has a bearing bushing 70 positioned in the slotted opening 72 of web 28, the bushing being retained in position by the hold-down spring 74 which cooperates with the spring retainer 76 and the pin member 78. The pin member extends into engagement with the backing plate 10 in the conventional manner. Slotted opening 72 has an arcuated end 80 extending toward the shoe rim 24 and a larger arcuate end 82 opposite end 80 so that the slot extends in a manner generally toward the anchor pin 30 in an opening manner. Bushing 70 extends through the slot 72 and has a shank outer radius substantially equal to the radius of the slot arcuate end 80. Bushing 70 is normally positioned in arcuate end 80 as seen in FIGURE 4.

The adjusting lever 68 has one end portion 84 thereof arranged in the form of a detent which is engageable with the serrations 56 in the wheel 52 to effect rotation of the wheel when the lower end 55 of the lever rotates in a counterclockwise direction about the bushing 70. The upper end of lever 68 is provided with a hook 86 to which one end of a rigid wire link member 88 is attached. The opposite end of member 88 is hooked into an opening in the bracket 40, which is a part of the anchor arrangement of the brakes.

A spring 138 is provided which engages the actuating lever 68 and is mounted on the shoe 16 by means of the spring reaction member 140 extending through and secured to the shoe web 28. Spring 138 is preferably U-shaped so that its legs respectively fit in recesses 142 and 144 on opposite sides of lever 68 and shoe web 28, with the center bend portion 146 of the spring engaging the adjusting lever 68 along the lever edge surface 148. The spring legs may be provided with shaped sections 150 to aid in their engagement with and retention by the reaction member 140. The spring leg outer ends 152 engage the shoe rim 24 so that the spring exerts a continual cantilever force against adjusting lever 68 urging it against translatory movement and resiliently holding bushing 70 against the slot end 80.

The arrangement of the adjusting mechanism is such that when lever 68 is prevented from pivotal movement about bushing 70 for any reason, and a brake application is made which causes brake shoe 16 to move clockwise away from the anchor pin 30, the bushing 70 will be forced to move toward the end 82 of slot 72 against the force of spring 138, thus preventing any breakage of the components of the adjuster or the brake.

In normal operation, when the brake is applied, with the vehicle in reverse, the shoe 16 moves away from the anchor pin 30 until it contacts the brake drum and is then pulled around in a clockwise direction as seen in FIGURE 1. Since the bushing 70 normally moves with the shoe and tends to remain in the end 80 of slot 72, and since the upper end 86 of the lever 68 is held at a fixed distance from the anchor pin 30 by the link member 88, the lower end of the lever 68 is forced down so that the detent end 84 engages a serration 56 of wheel 52 to turn the wheel and in turn unscrew the strut 46 to adjust the brake in accordance with the wear of the brake shoes. Normally the load required to turn the wheel 52 is proportionately less than that exerted by spring 138 so that the pivot bushing 70 remains in the end 80 of slotted opening 72.

There are times when a heavy brake action occurs with the vehicle in reverse which produces a high axial thrust on the adjusting strut 46 which is sufficient to prevent the threaded portion 48 from turning in the cylinder portion 50, thereby holding the wheel 52 stationary. This condition prevents the lever 68 from rotating in its normal manner on shoe web 28 so that if pivot bushing 70 were prevented from movement relative to the shoe web, excessively high stresses would be applied to lever 68 which would either break it or overstress the parts to such an extent that they would subsequently malfunction. The relief action obtained by movement of bushing 70 in slotted opening 72, due to the lost motion type movement as permitted by spring 138, prevents such detrimental action.

I claim:
1. In a brake having a fixed member and a pair of shoes and an adjusting strut between said shoes, a brake self-adjusting assembly comprising, a brake adjusting lever, means rotatably and translatably mounting said adjusting lever on one of said shoes, said adjusting lever having one end engageable with said adjusting strut upon sufficient lever rotation on said one shoe to extend said adjusting strut for brake adjustment in accordance with shoe wear, resilient means urging said lever against translatory movement on said one shoe, and link means attached to the other end of said lever and to said fixed member to normally effect rotation of said lever on said one shoe upon shoe movement and to effect translatory movement of said lever on said one shoe against the action of said resilient means upon movement of said one shoe when the adjustment resistance of said adjusting strut exceeds the effective force of said resilient means.

2. The brake self-adjusting assembly of claim 1, said resilient means comprising a spring acting on said one shoe and on said adjusting lever to oppose translatory movement of said adjusting lever on said one shoe.

3. The brake self-adjusting assembly of claim 2, said spring means having a reaction member secured to said one shoe and extending on opposite sides of the web thereof, said spring means being formed in a generally U shape wherein the free ends thereof engage the rim of said one shoe and the leg portions thereof extend on opposite sides of the web of said one shoe and said adjusting lever and engage said reaction member, said adjusting lever being engaged by the center bend portion of said spring means.

4. The brake self-adjusting assembly of claim 1, the mounting means for said adjusting lever comprising an elongated slot formed in the web of said one shoe and a bushing extending through said lever in said slot and forming a part of a hold-down spring assembly.

5. In a brake having a primary shoe and a secondary shoe and a stationary member on which said shoes are movably mounted for brake actuation and release, an automatic adjuster to maintain a predetermined brake shoe clearance in accordance with shoe wear, said adjuster comprising, an extendable strut between the shoes including a rotating wheel to extend the strut upon wheel rotation, a lever, means rotatably and slidably mounting said lever on one of said shoes, said lever having one end thereof engageable with said wheel to rotate the wheel upon rotation of said lever, resilient means urging said lever against sliding movement on said shoe, and link means operatively connected with said stationary member and said lever to effect rotation of said lever upon movement of said one shoe to rotate said wheel and extend said strut.

References Cited in the file of this patent
UNITED STATES PATENTS
3,050,157 Kenzik et al. _____ Aug. 21, 1962
FOREIGN PATENTS
612,360 Great Britain _____ Nov. 11, 1948